(12) United States Patent
Aas et al.

(10) Patent No.: US 11,073,653 B2
(45) Date of Patent: Jul. 27, 2021

(54) EDGE COUPLED LIGHT COLLIMATION FOR BACKLIGHT

(71) Applicant: Lumileds LLC, San Jose, CA (US)

(72) Inventors: Mehdi Aas, Eindhoven (NL); Arjen Gerben Van der Sijde, Eindhoven (NL); Erno Fancsali, Heusden-Zolder (BE); Nicola Bettina Pfeffer, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/721,609

(22) Filed: Dec. 19, 2019

(65) Prior Publication Data

US 2021/0191033 A1    Jun. 24, 2021

(51) Int. Cl.
*F21V 8/00* (2006.01)

(52) U.S. Cl.
CPC .......... *G02B 6/0088* (2013.01); *G02B 6/002* (2013.01); *G02B 6/003* (2013.01); *G02B 6/0065* (2013.01)

(58) Field of Classification Search
CPC .... G02B 6/0088; G02B 6/003; G02B 6/0065; G02B 6/002
See application file for complete search history.

(56) References Cited

U.S. PATENT DOCUMENTS

| | | |
|---|---|---|
| 2004/0141104 A1* | 7/2004 | Yu .......................... G02B 6/003 349/65 |
| 2006/0152820 A1 | 7/2006 | Lien et al. |
| 2011/0141734 A1 | 6/2011 | Li et al. |
| 2014/0160766 A1* | 6/2014 | Chinniah ........... G02B 19/0028 362/308 |
| 2019/0212560 A1 | 7/2019 | Sugiyama et al. |

OTHER PUBLICATIONS

"European Application Serial No. 20215092.6, Extended European Search Report dated Apr. 26, 2021", 9 pgs.

* cited by examiner

*Primary Examiner* — Donald L Raleigh
(74) *Attorney, Agent, or Firm* — Schwegman Lundberg & Woessner, P.A.

(57) ABSTRACT

A backlight apparatus can include a lens to receive light and generate light with a collimated batwing configuration. The lens can include a receiving surface and an opposing transmission surface. The lens can be symmetric about a plane of symmetry. The transmission surface can include an angle of curvature that increases closer to the plane of symmetry.

20 Claims, 8 Drawing Sheets

US 11,073,653 B2

EDGE COUPLED LIGHT COLLIMATION FOR BACKLIGHT

TECHNICAL FIELD

The present disclosure relates to a display device with an improved backlight. The improved backlight includes a lens configured to increase an average angle of incidence of light emitted from a light emitting element of the backlight. The angle of incidence is increased relative to a major surface of a light guide plate facing the display device.

BACKGROUND

Backlights suffer from problems of non-uniform lighting. The non-uniform lighting can be caused by insufficient light incident on a light guide panel (LGP) of the backlight, or hot (very bright) and dark spots caused, at least partially, by an angle at which the light is incident on the LGP. These problems cause display devices to provide images with an unintended bright or dark spot.

BRIEF DESCRIPTION OF THE DRAWINGS

The figures show various views of an apparatus, including a lens that can shape light emerging from one or more light emitting diodes (LEDs), in accordance with some embodiments. In the views presented herein, it is assumed that light emerges from a front of the lens, such that the LED or LEDs can be positioned toward a rear of the lens. The terms "front," "rear," "top," "bottom, "side," are to be understood relative to one another with "front" and "rear" opposing each other, "top" and "bottom" opposing each other, and "side" between "top" and "bottom." Other directional terms are used merely for convenience in describing the lens and other elements and should not be construed as limiting in any way.

Figure 1:
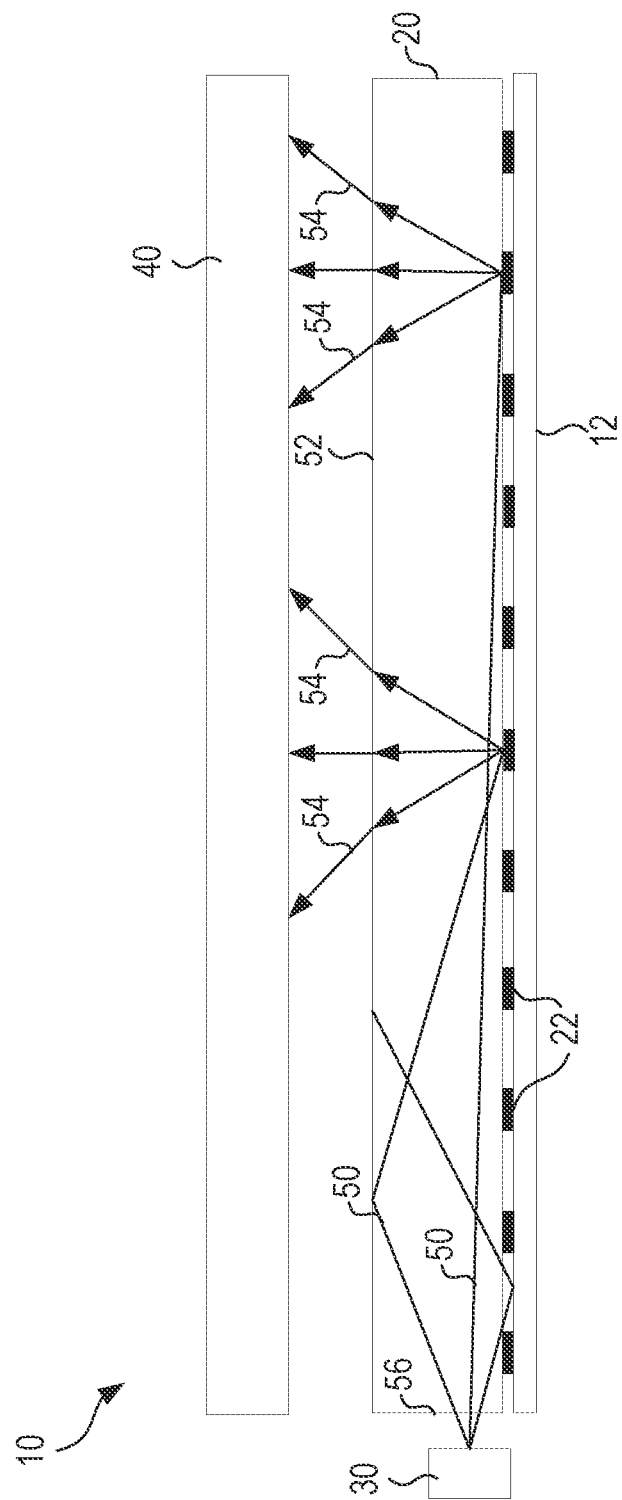
FIG. 1 illustrates, by way of example, a diagram of an embodiment of a backlight unit comprising a planar light guide disposed on a substrate, and a light emitting element disposed on a side of the light guide.

Corresponding reference characters indicate corresponding parts throughout the several views. Elements in the drawings are not necessarily drawn to scale. The configurations shown in the drawings are merely examples and should not be construed as limiting the scope of the disclosed subject matter in any manner.

DETAILED DESCRIPTION

FIG. 1 illustrates, by way of example, a diagram of an embodiment of a backlight unit 10 comprising a planar light guide 20 disposed on a substrate 12, and a light emitting element 30 disposed on a side of the light guide 20. Some light 50 entering the light guide 20 from the light emitting element 30 is reflected towards a top surface 52 of the light guide 20 by a patterned reflection sheet 22 and another optional reflection sheet (see FIGS. 2, 3, for example) positioned between the light guide 20 and backplate (see FIGS. 2, 3), and exits from the light guide 20. Light 54 that exits provides backlight to a display 40 (e.g., a liquid crystal display (LCD)) on an opposite side of the light guide 20 as the reflection sheet 22.

Figure 2:
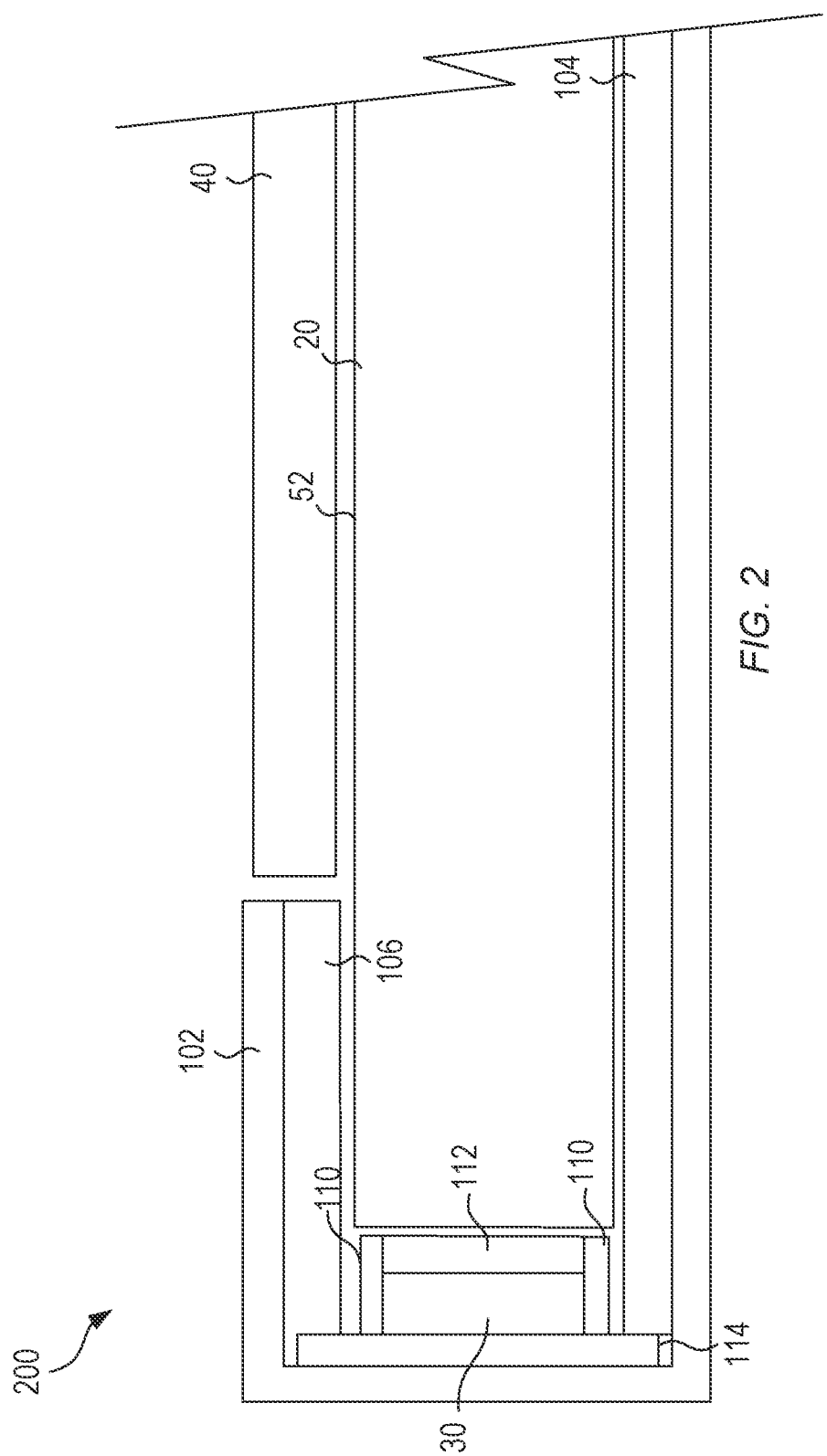
FIG. 2 illustrates, by way of example, a cross-section diagram of an embodiment of a display device that includes a backlight.

FIG. 2 illustrates, by way of example, a cross-section diagram of an embodiment of a display device 200 that includes a backlight. The display device 200 includes the display 40, the light guide 20, and the light emitting element 30. The display 40 can include an LCD screen in accordance with some embodiments. The LCD screen can be part of a television, a computer monitor, a smartphone screen, a watch screen, calculator screen, or other screen.

The light emitting element 30 transmits light towards the light guide 20. The light emitting element 30 can include a light emitting diode (LED), a cold-cathode fluorescent lamp (CCFL), or the like. Theoretically, the light emitting element 30 can produce light with a Lambertian or near Lambertian distribution. The light emitting element 30 can generate light of generally any practical wavelength or color.

The display device 200 further includes a backplate 102, reflector sheets 104, 106, a top coating 112, a side coating 110, and a substrate 114. The backplate 102 provides protection from an external environment for the reflector sheets 104, 106, the light emitting element 30, the substrate 114, the light guide 20, and a surface of the display 40 facing the light guide 20. The backplate 102 can be made of metal, ceramic, polymer, or the like. An extent that the backplate 102 extends over the top surface 52 of the light guide 20 is sometimes called a bezel. The top coating 112, the side coating 110, and the light emitting element 30 can be parts of an LED.

The reflector sheet 104, 106 is made of a light scattering and highly reflective material. The reflective material can reflect 90%, 95%, 99%, more or less light, or some value therebetween, of the light incident thereon. The reflector sheet 104, 106 can be patterned to help scatter the light or reflect the light to a specified location.

The top coating 112 can alter a color of the light from the light emitting element 30. For example, if the top coating 112 is phosphor, the light emitted from the light emitting element 30 can appear whiter to the human eye. This is because phosphor absorbs some of the blue light emitted from the light emitting element 30.

The side coating 110 can be made of a wide scattering, highly reflective material (e.g., above 80%, 85%, 90%, 95%, 99%, or some percentage therebetween of reflection at the wavelength of the light emitting element 30). The side coating 110 helps the light emitting element 30 avoid producing hot spots. The side coating 110 helps reduce ingress of light to the light emitting element 30. The side coating 110 can also help ensure that more light is transmitted through the top coating 112 or towards the light guide 20. Examples of side coating materials include filled silicon, acrylic, a white plastic, or other dielectric coating.

The substrate 114 can provide power and circuit routing for the light emitting element 30. The light emitting element 30 can be electrically and mechanically connected to electrical power through a trace or other electrical interconnect on or in the substrate 114. The substrate can include a flex or rigid printed circuitry board (PCB). A flex PCB can be made of polyimide, polydimethylsiloxane, or the like. A rigid PCB can be made of FR-4, prepreg, or the like.

The light guide 20 is designed to spread the light from the light emitting element 30 as uniformly as possible across the display 40. However, the backlight unit 10 of FIG. 1 and the display device 200 of FIG. 2 suffer from issues of diffraction inefficiencies. The diffraction pattern on the light guide surface 52 has a higher diffraction efficiency with more efficient at providing light with input light provided at a higher angle. The coupling of light from the light guide 20 to the display 40 is based on the reflective to transmissive diffraction pattern on the input surface 56 and transmission surface 52, respectively. Higher incoupling angles from the surface 56 provide more efficient outcoupling from the light guide 20 at the transmission surface 52. Example embodiments provide a solution to increase the angle of incidence of a majority of the light entering the light guide 20.

Figure 3:
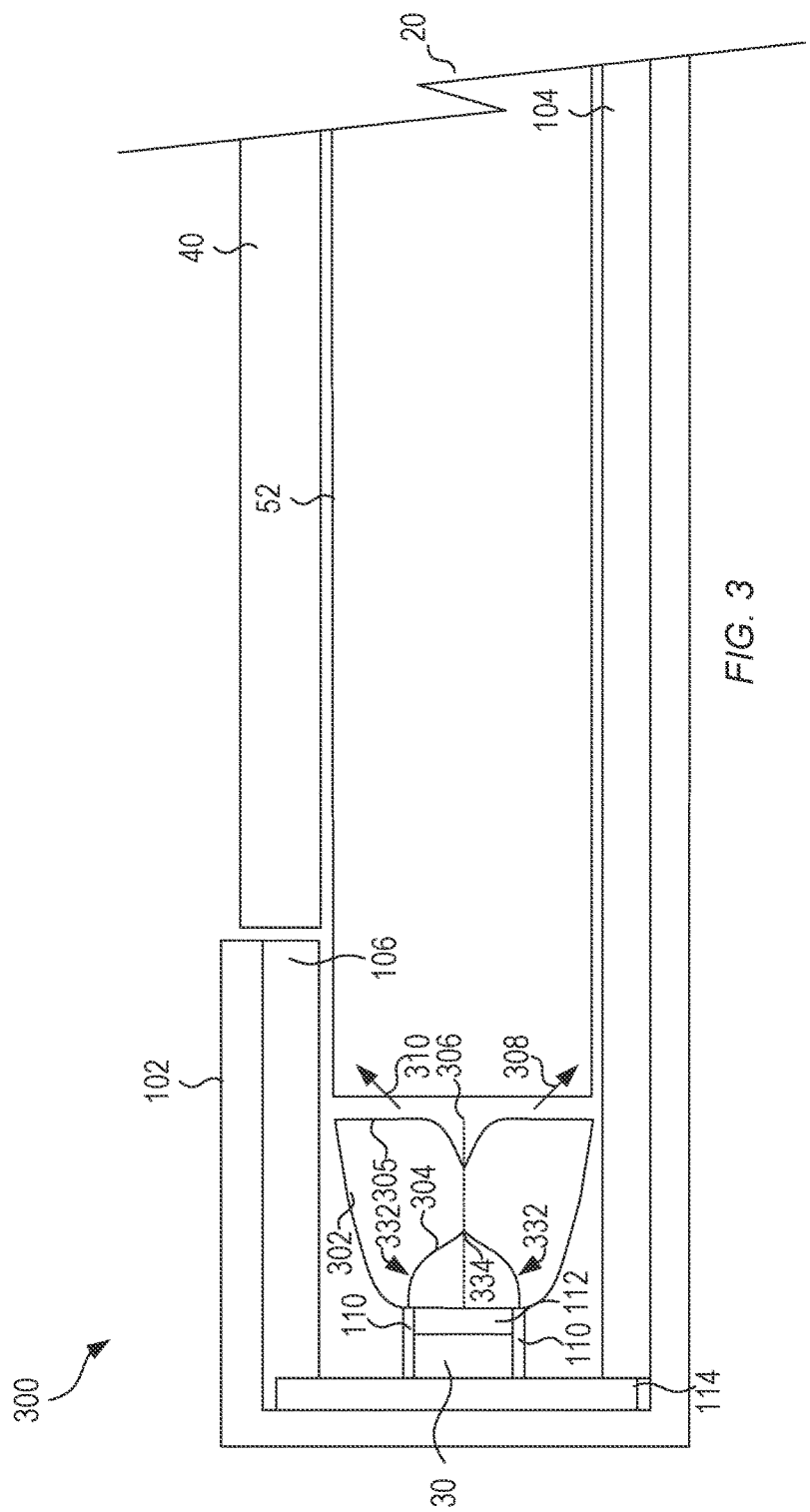
FIG. 3 illustrates, by way of example, a diagram of an embodiment of a display device that does not suffer from the same issues as the display device of FIG. 2.

FIG. 3 illustrates, by way of example, a diagram of an embodiment of a display device 300 that does not suffer from the same issues as the display device 200. The display device 300 is similar to the display device 200 but includes a lens 302.

The lens 302 focuses light incident thereon. The light incident on the lens 302 can include light (a) directly from the light emitting element 30 and/or (b) reflected from the coating 110 to the lens 302. The focus provided by the lens 302 directs light into two at least partially collimated beams, such as collimated or semi-collimated beams, represented by arrows 308, 310. The lens 302 can be symmetric about a plane of symmetry 306. The directing of the light is provided by a contour of a receiving surface 304 and a contour of an opposing transmission surface 305 of the lens 302. The receiving surface 304 is a surface of the lens 302 facing the light emitting element 30. The transmission surface 305 of the lens 302 faces the light guide 20. The transmission surface 305 opposes the receiving surface 304. Light from the light emitting element 30 enters the lens 302 through the receiving surface 304 and exits the lens 302 through the transmission surface 305.

The receiving surface 304, as illustrated, is generally symmetric about the plane of symmetry 306. Each of the symmetric portions of the lens 302 include a concave portion 332. Convex and concave are to be understood to be relative to the component emitting light to the lens 302. In this case, concave and convex are relative to the transmission surface of the light emitting element 30.

The concave portion 332 redirects light towards the plane of symmetry 306 of the lens 302. The concave portion 332 redirects light incident thereon further from the plane of symmetry 306 more than it redirects light incident thereon closer to the plane of symmetry. This is due to an angle of curvature of the concave portion 332 being smaller closer to the plane of symmetry 306 than when it is farther from the plane of symmetry 306. In other words, an angle of curvature of the concave portion 332 increases farther from the plane of symmetry 306. The concave portion 332 redirects light to be part of the beams represented by the arrows 308, 310.

In example embodiments, the lens 302 transmits light within a first range of transmission angles [−10, 10] out of the lens 302 without becoming part of the beams represented by arrows 308, 310. The transmission angles are relative to the plane of symmetry 306. A majority of the light transmitted within a second range of transmission angles of [10, 90] can be collimated into the beam corresponding to arrow 310. The angle of the beam can be at about 50 to 70 degrees from the plane of symmetry 306 of the lens 302. A majority of the light transmitted within a third range of transmission angles [−10, −90] can be collimated into the beam corresponding to arrow 308. The angle of the beam can be at about −50 to −70 degrees from the plane of symmetry 306. The angles are illustrated in intensity diagrams of FIGS. 10 and 11, which will be discussed in more detail below.

Figure 10:
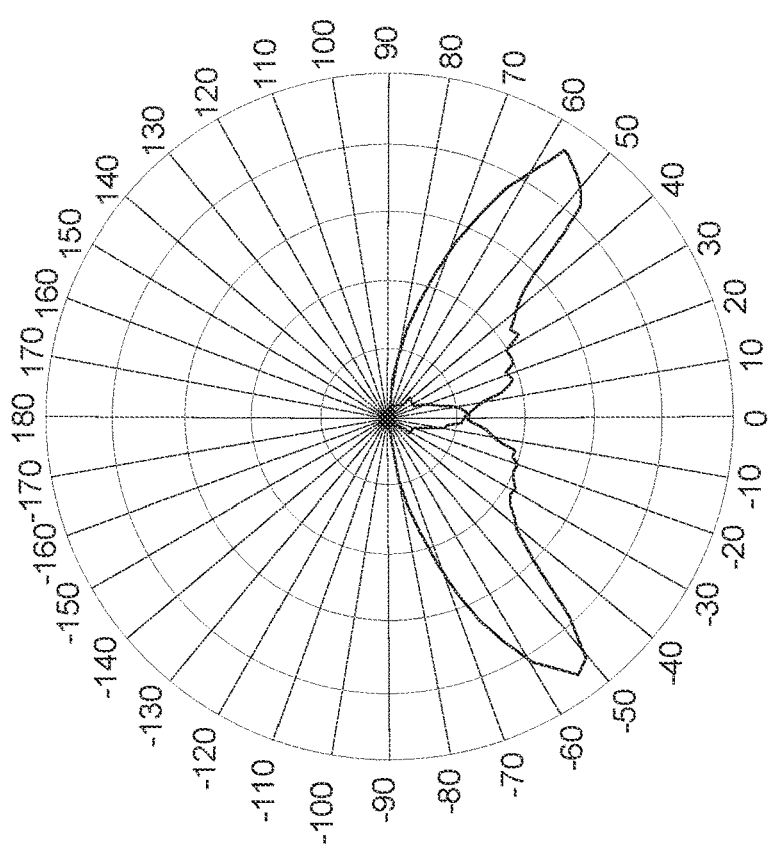
FIG. 10 illustrates, by way of example, a plot of intensity versus angle for light emitted through the lens.

The shape of the light emitted from the lens 302 can include a batwing intensity profile in a vertical intensity slice perpendicular to the plane of symmetry 306 (see FIG. 10). The shape of the light emitted from the lens 302 can include a collimated beam in a horizontal intensity slice (see FIG. 11). The intensity profiles can be from a generally Lambertian source.

Figure 4:
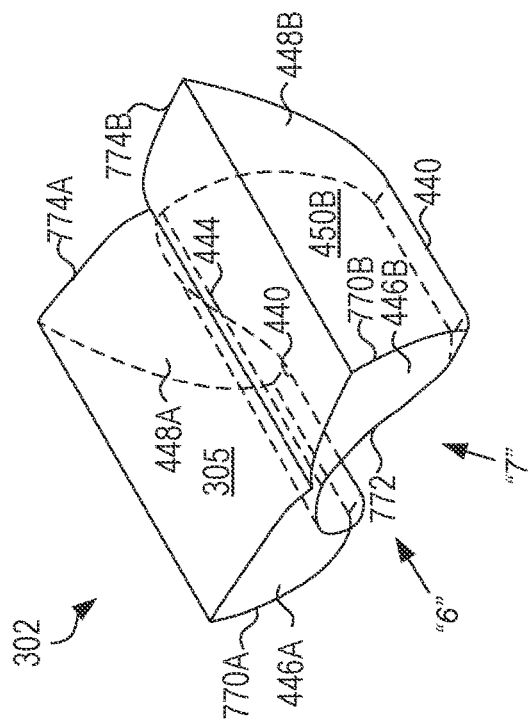
FIGS. 4, 5, 6, and 7 illustrate, by way of example, perspective-view diagrams of the lens.
Figure 6:
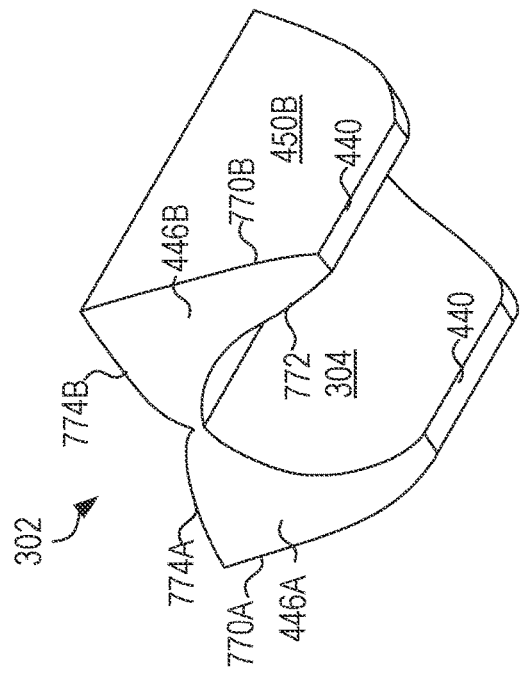
Figure 5:
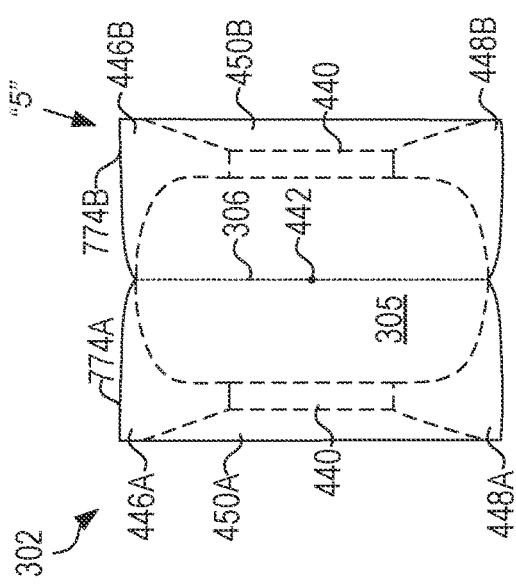
Figure 7:
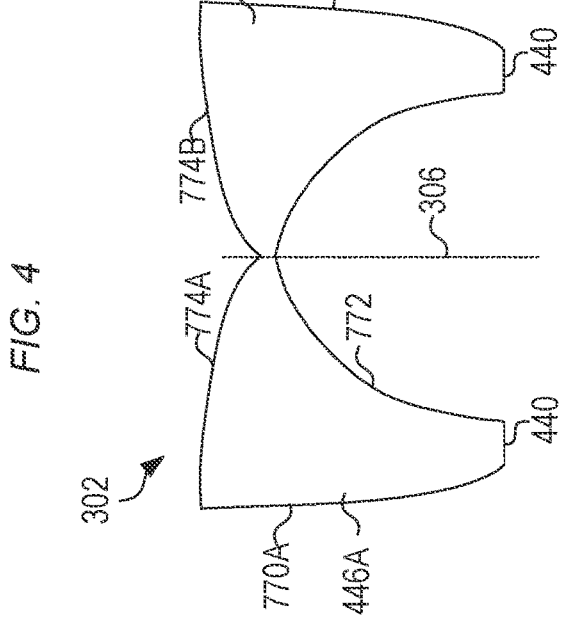

FIGS. 4, 5, 6, and 7 illustrate, by way of example, perspective-view diagrams of the lens 302. The perspective of FIG. 4 is looking straight down at the transmission surface 305. The perspective view of FIG. 5 is looking at the lens 302 from the arrow labelled "5" in FIG. 4. The perspective view of FIG. 6 is looking at the lens 302 from the arrow labelled "6" in FIG. 5. The perspective view of FIG. 7 is looking at the lens 302 from the arrow labelled "7" in FIG. 5. Items in dashed lines are normally occluded in the perspective of the corresponding FIG.

The lens 302, as illustrated, includes the receiving surface 304 and the transmission surface 305. The lens 302 can include two feet 440. The feet 440 can be rectangular in perimeter. The feet 440 can provide a flat surface that provides stability to the lens 302. The feet 440 can form the base of the lens 302 (e.g., a surface on which the lens 302 is meant to sit). The feet 440 can be in contact with or attached to a structure around the lens 302, such as a portion of the light emitting element 30. The lens 302 can be symmetric about a plane of symmetry 306.

The lens 302 includes sides 446 and 448 extending between the transmission surface 304 (the transmission surface 304 is occluded in the view of FIG. 4) and the receiving surface 304 and between the transmission surface 305 and the feet 440. The sides 446A, 448A and 446B, 448B, when situated in the backplate 102 and over the light emitting element 30, are situated on top and bottom of each other. The sides 446A, 448A, when situated in the backplate 102 are more proximate to the reflector sheet 106 or the top surface 52 of the light guide 20 than the sides 446B, 448B, The sides 4463, 448B, when situated in the backplate 102 are more proximate to the reflector sheet 104 or the bottom surface (the surface opposing the top surface 52) of the light guide 20 than the sides 446A, 448A.

The sides 446A, 448A include a lowercase "r" shaped profile and the sides 446B, 448B include backwards lowercase "r" shaped profile (see FIG. 7, for example). The forward and backwards lower case "r" shapes meet at the plane of symmetry 306. The sides 446A, 446B and 448A, 448B meet to form an inner surface that includes a parabolic perimeter.

Top edges 774A, 774B, of the sides 446A, 446B, 448A, 448B, can include respective, symmetric concave shapes (relative to the light emitting element 30 and about the plane of symmetry 306). The top edge 774A, 774B forms a contour of the transmission surface 305. The top edge 774A, 774B can include a greater angle of curvature closer to the plane of symmetry 306 and a lesser angle of curvature farther form the plane of symmetry 306. The angle of curvature can gradually change from the plane of symmetry 306 to an outer edge 770A, 770B.

The outer edge 770A, 770B of the sides 446A, 446B, 448A, 448B can include a concave shape relative to the plane of symmetry 306. The outer edge 770A, 770B can include an angle of curvature that is greater at the feet 440 than at the top edge 774A, 774B. The angle of curvature can gradually change from the feet 440 to the outer edge 770A, 770B.

The sides 446A, 4446B, 448A, 448B can be tilted from the top edge 774A, 774B towards a center 442 of the lens 302. The top edges 774A, 774B can combine to form a portion of the perimeter of the transmission surface 305.

Sides 450A, 450B can extend between an edge 884A, 884B (see FIG. 8) of the top surface 305 to the feet 440. The sides 450A, 450B can further extend between the sides 446A, 448A and the sides 446B, 448B, respectively. The sides 450A, 450B can be tilted from the top edge 774A, 774B towards a center 442 of the lens 302.

Figure 8:
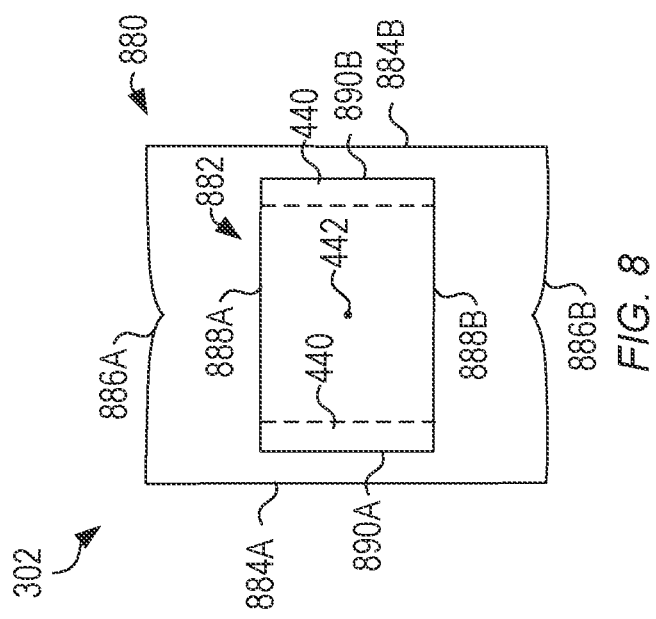
FIG. 8 illustrates, by way of example, a diagram of an embodiment of the lens that includes a perimeter of a transmission surface and a perimeter of an opposing surface that includes an outer surface of the feet.

FIG. 8 illustrates, by way of example, a diagram of an embodiment of the lens 302 that includes a perimeter 880 of the transmission surface 305 and a perimeter 882 of the opposing surface that includes an exposed outer surface of the feet 440. The perimeter 882 can be rectangular and smaller than the perimeter 880. The perimeter 880 can include opposing linear edges 884A, 884B that extend between opposing edges 886A, 886B. The perimeters 880 and 882 encompass what are sometimes called major surfaces of the lens 302. The perimeters 880 and 882 encompass opposing major surfaces of the lens 302.

The sides 446, 448 (see FIGS. 4-7) can extend from an edge 886A, 886B of the perimeter 880 to an edge 888A, 888B of the perimeter 882. The sides 446, 448 can thus tilt away from the center 442 as they extend from the edge 888A, 888B towards the edge 886A, 886B.

The sides 450A, 450B (see FIGS. 4-7) can extend from an edge 884A, 884B of the perimeter 880 to an edge 890A, 890B of the perimeter 882. The sides 450A, 450B can thus tilt away from the center 442 as they extend from the edge 884A, 884B towards the edge 890A, 890B.

Figure 9:
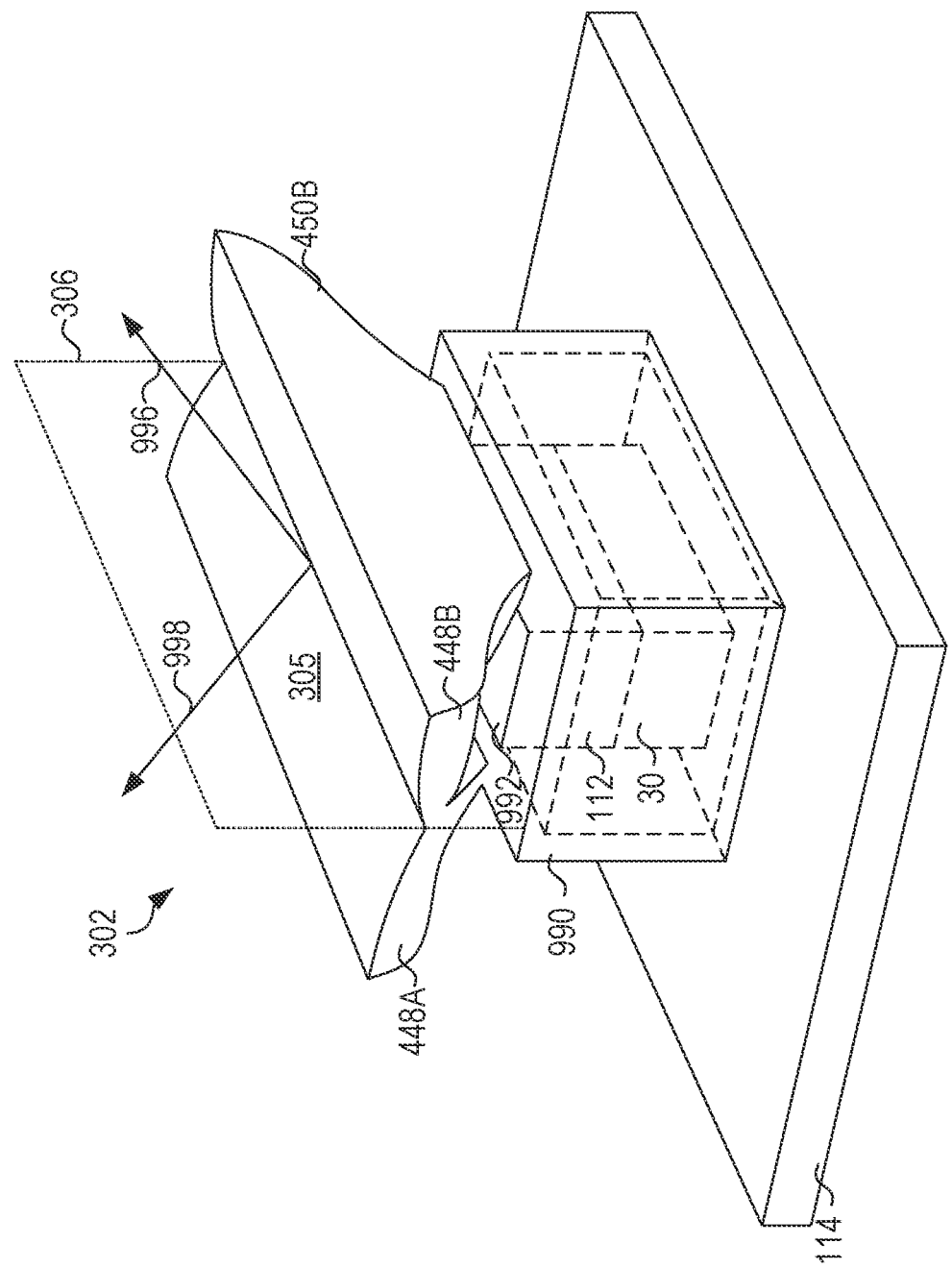
FIG. 9 illustrates, by way of example, a perspective-view diagram of an embodiment of a portion of the display device.

FIG. 9 illustrates, by way of example, a perspective-view diagram of an embodiment of a portion of the display device 300. The portion illustrated in FIG. 9 includes the lens 302 mounted on a housing 990 around the light emitting element 30. The housing 990 can protect the light emitting element 30 from an external environment, such as debris or other light external to the housing 990. The housing 990 can include an aperture 992 through which light can be transmitted from the light emitting element 30 to the lens 302 (e.g., a receiving surface 304 of the lens 302). The housing 990 can include the coating 110 on internal surfaces (e.g., surfaces facing the light emitting element 30) thereof.

The lens 302 can be adhered to the housing 990, such as by an adhesive. In some embodiments, the lens 302 is integrally formed with the housing 990, such as by injection molding, three-dimensional (3D) printing, or the like.

The light-emitting element 30 can be oriented to emit the visible light in an angular distribution. Light directly from the light-emitting element 30 and light from the light emitting element 30 reflected off the coating 110 can be incident on the receiving surface 304 of the lens 302. The lens 302 can receive the light directly from the light emitting element 30 and reflected from the coating 110, and emit light (represented by arrows 996, 998) in a batwing configuration.

FIG. 10 illustrates, by way of example, a plot of intensity versus angle for light emitted through the lens 302. In the plot of FIG. 10, the light emitting element 30 produces light at about a 180-degree angle (same as −180) towards an origin of the plot. The light from the transmission surface 305 is emitted in a batwing configuration with collimated beams at about between [50, 70] and [−50, −70] degrees.

Figure 11:
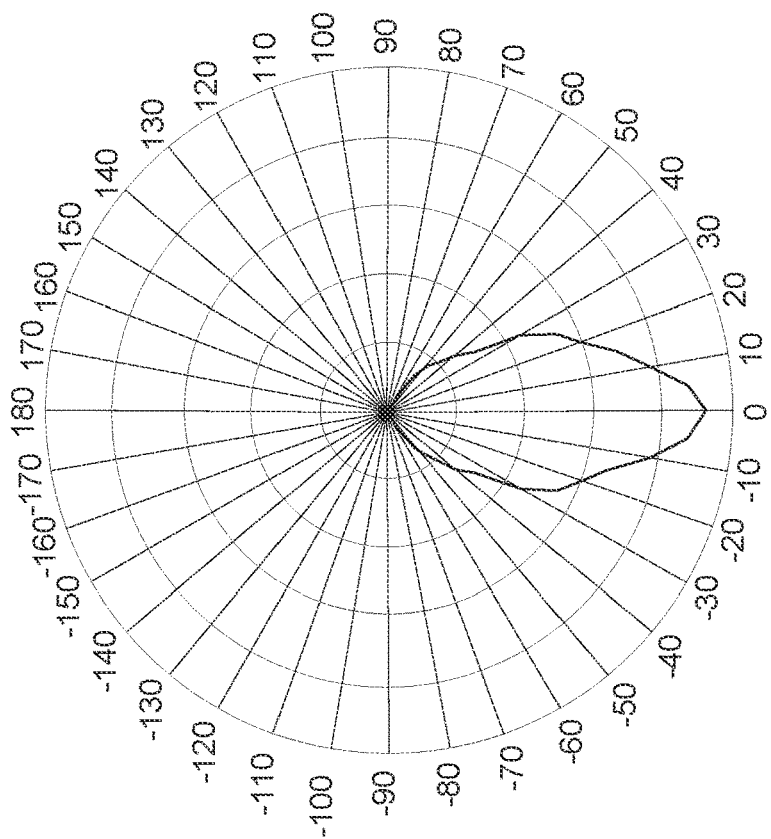
FIG. 11 illustrates, by way of example, another plot of intensity versus angle for light emitted through the lens.

FIG. 11 illustrates, by way of example, another plot of intensity versus angle for light emitted through the lens 302. In the plot of FIG. 11, the light emitting element 30 produces light at the same spot as in the plot of FIG. 10, with the view of FIG. 11 being from the direction directly opposing the arrow 308, 310. FIG. 11 is a slice intensity profile on a plane perpendicular to one of the peaks in FIG. 10. The plot in FIG. 11 shows that the beams emitted by the lens 302 are collimated.

As used herein, the phrase generally planar is intended to mean planar to within typical manufacturing tolerance and/or typical alignment tolerances. For the purposes of this document, the use of the term visible light can be generalized to light having a first range of wavelengths.

The circuit board 114 can be at least partially coated with a coating that is reflective for visible light. The coated portion of the circuit board 114 can reflect visible light to the lens 302.

Figure 12:
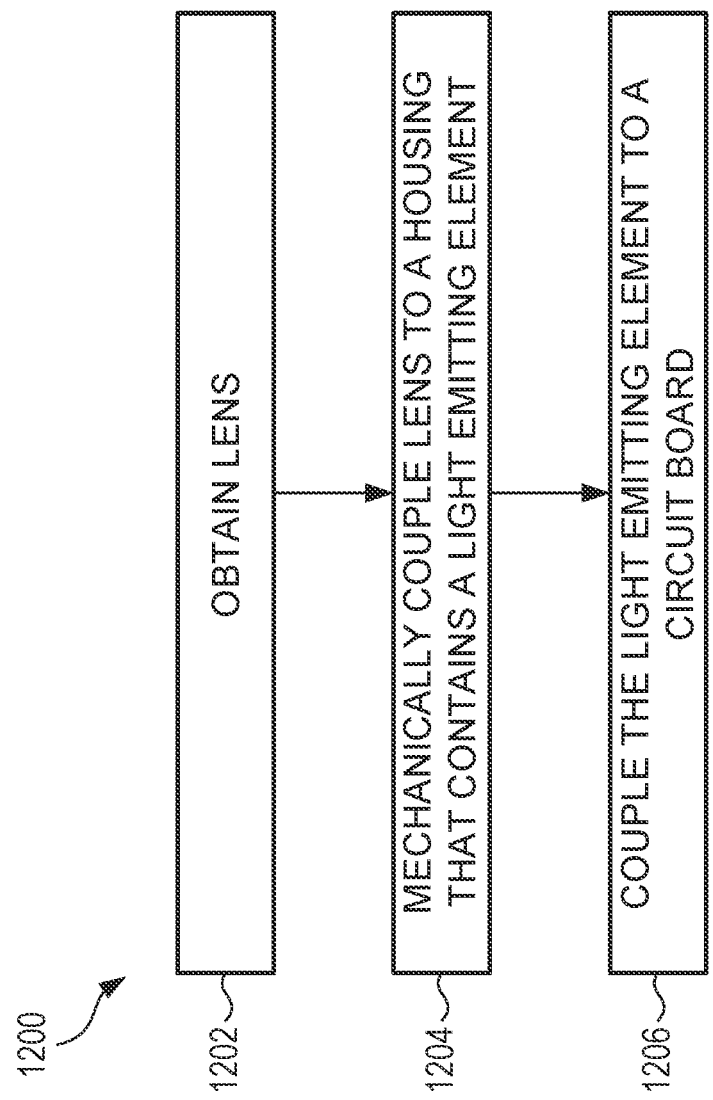
FIG. 12 illustrates, by way of example, a flow diagram of an embodiment of a method for forming an improved backlight.

FIG. 12 illustrates, by way of example, a flow diagram of an embodiment of a method for forming an improved backlight. The method 1200 can be used to form any of the apparatuses of FIGS. 3-9, among other apparatuses. The method 1200 is but one method for forming a light-emitting apparatus; other suitable methods can also be used.

The method 1200 as illustrated includes obtaining a lens, such as the lens 302, at operation 1202; mechanically coupling the lens to a housing that contains a light emitting element, such as the light emitting element 30, at operation 1204; and coupling the light emitting element to a circuit board, such as the substrate 114, at operation 1206. The method 1200 can include situating a light guide panel 20 to receive light emitted by the lens and to distribute the light towards a display screen, such as a liquid crystal display screen.

To further illustrate the apparatus and related method disclosed herein, a non-limiting list of examples is provided below. Each of the following non-limiting examples can stand on its own or can be combined in any permutation or combination with any one or more of the other examples.

In Example 1, a backlight apparatus can include a backplate, a light emitting element located within the backplate and configured to emit visible light, a lens located within the backplate and configured to angularly redirect the visible light into a batwing configuration of first and second collimated light beams, the lens including a receiving surface facing the light emitting element and a transmission surface opposing the receiving surface, the transmission surface including an angle of curvature that increases closer to a plane of symmetry of the lens, and a light guide panel configured to distribute light from the first and second collimated light beams to a surface of the light guide panel facing a display device.

In Example 2, Example 1 can further include, wherein an angle of a center axis of the first collimated light beam is greater than 45 degrees from the plane of symmetry of the lens, and an angle of a center axis of the second collimated light beam is greater than negative 45 degrees from the plane of symmetry of the lens.

In Example 3, at least one of Examples 1-2 can further include, wherein the lens is situated between the light emitting element and the light guide panel, and the light emitting element is situated between the backplate and the lens.

In Example 4, at least one of Examples 1-3 can further include, wherein the lens further includes generally planar feet opposing the transmission surface and from which the receiving surface extends.

In Example 5, at least one of Examples 1-4 can further include, wherein a first perimeter of a surface of the lens facing the light emitting element and opposing the transmission surface is smaller than a second perimeter of the transmission surface.

In Example 6, Example 5 can further include, wherein the first perimeter is generally rectangular, and the second perimeter includes first and second opposing curved edges with an angle of curvature that increases closer to the plane of symmetry of the lens.

In Example 7, Example 6 can further include, wherein the second perimeter includes generally linear opposing edges extending between the first and second opposing curved edges.

In Example 8, Example 7 can further include, wherein the lens includes first and second sides extending between respective generally linear edges and respective feet.

In Example 9, Example 8 can further include, wherein the first and second sides tilt away from the respective feet as they extend towards the respective generally linear edges.

In Example 10, at least one of Examples 8-9 can further include, wherein the lens includes opposing third and fourth sides extending between the first and second curved edges, respectively, and the respective feet.

In Example 11, Example 10 can further include, wherein the third and fourth sides include a concave edge facing the light emitting element and an opposing edge extending between the first and second curved edges, respectively, and the respective feet.

In Example 12, Example 11 can further include, wherein the first and second curved edges include an angle of curvature that increases closer to the respective feet.

Example 13 can include a display device comprising a liquid crystal display, a light emitting element configured to emit visible light, a circuit board electrically and mechanically coupled to the light emitting element, a lens configured to angularly redirect the visible light into a batwing configuration of first and second collimated light beams, the lens including a receiving surface facing the light emitting element and a transmission surface opposing the receiving surface, the transmission surface including an angle of curvature that increases closer to a plane of symmetry of the lens, and a light guide panel configured to distribute light from the first and second light beams to a surface of the light guide panel facing the liquid crystal display.

In Example 14, Example 13 can further include, wherein an angle of a center of the first collimated light beam is greater than 45 degrees from the plane of symmetry of the lens, and an angle of the second collimated light beam is greater than negative 45 degrees from the plane of symmetry of the lens.

In Example 15, at least one of Examples 13-14 can further include, wherein the lens further includes feet opposing the transmission surface and from which the receiving surface extends, a first perimeter of a surface of the lens facing the light emitting element and opposing the transmission surface is smaller than a second perimeter of the transmission surface, and the second perimeter includes first and second opposing curved edges with an angle of curvature that increases closer to the plane of symmetry of the lens.

In Example 16, Example 15 can further include, wherein the lens includes first and second sides extending between respective generally linear edges and respective feet, and the first and second sides tilt away from the respective feet towards the respective generally linear edges.

In Example 17, Example 16 can further include, wherein the lens includes opposing third and fourth sides extending between the first and second curved edges, respectively, and respective feet, and the third and fourth sides include a concave edge facing the light emitting element and an opposing edge extending between the between the first and second curved edges, respectively, and respective feet.

In Example 18, at least one of Examples 16-17 can further include, wherein the first and second curved edges include an angle of curvature that increases closer to the feet.

Example 19 includes a method of forming a backlight apparatus, the method comprising obtaining a lens that includes a receiving surface and a transmission surface, the lens being symmetric about a plane of symmetry that bisects the transmission surface, mechanically coupling the lens to a top of a housing that contains a light-emitting element therein such that the light emitting element faces an aperture in the top of the housing and a receiving surface of the lens, and electrically and mechanically coupling the light-emitting diode to a circuit board.

In Example 20, Example 19 can further include situating a light guide panel to receive light emitted by the lens and to distribute the light towards a display device.

While embodiments of the present disclosed subject matter have been shown and described herein, it will be obvious to those skilled in the art that such embodiments are provided by way of example only. Numerous variations, changes, and substitutions will now occur to those skilled in the art, upon reading and understanding the material provided herein, without departing from the disclosed subject matter. It should be understood that various alternatives to the embodiments of the disclosed subject matter described herein may be employed in practicing the various embodiments of the subject matter. It is intended that the following claims define the scope of the disclosed subject matter and that methods and structures within the scope of these claims and their equivalents be covered thereby.

What is claimed is:

1. A backlight apparatus, comprising:
   a backplate;
   a light emitting element located within the backplate and configured to emit visible light;
   a lens located within the backplate and configured to angularly redirect the visible light into a batwing configuration of first and second collimated light beams, the lens including a parabolic-shaped receiving surface facing the light emitting element and a transmission surface opposing the receiving surface, the transmission surface including an angle of curvature that increases closer to a plane of symmetry of the lens; and
   a light guide panel configured to distribute light from the first and second collimated light beams to a surface of the light guide panel facing a display device.

2. The backlight apparatus of claim 1, wherein:
   an angle of a center axis of the first collimated light beam is greater than 45 degrees from the plane of symmetry of the lens, and
   an angle of a center axis of the second collimated light beam is greater than negative 45 degrees from the plane of symmetry of the lens.

3. The backlight apparatus of claim 1, wherein:
the lens is situated between the light emitting element and the light guide panel, and
the light emitting element is situated between the backplate and the lens.

4. The backlight apparatus of claim 1, wherein the lens further includes generally planar feet opposing the transmission surface and from which the receiving surface extends.

5. The backlight apparatus of claim 1, wherein a first perimeter of a surface of the lens facing the light emitting element and opposing the transmission surface is smaller than a second perimeter of the transmission surface.

6. The backlight apparatus of claim 5, wherein the first perimeter is generally rectangular, and the second perimeter includes first and second opposing curved edges with an angle of curvature that increases closer to the plane of symmetry of the lens.

7. The backlight apparatus of claim 6, wherein the second perimeter includes generally linear opposing edges extending between the first and second opposing curved edges.

8. The backlight apparatus of claim 7, wherein the lens includes first and second sides extending between respective generally linear edges and respective feet.

9. The backlight: apparatus of claim 8, wherein the first and second sides tilt away from the respective feet as they extend towards the respective generally linear edges.

10. The backlight apparatus of claim 8, wherein the lens includes opposing third and fourth sides extending between the first and second curved edges in a first dimension and a respective generally linear opposing edge of the generally linear opposing edges and a respective foot of the respective feet in a second dimension.

11. The backlight apparatus of claim 10, wherein the third and fourth sides include concave edges facing the light emitting element and extending between the first and second curved edges, respectively, and the respective feet in a third dimension wherein the third and fourth sides tilt away from the respective feet as they extend towards the first and second curved edges.

12. The backlight apparatus of claim 11, wherein the concave edges include an angle of curvature that increases closer to the respective feet.

13. A display device comprising:
a liquid crystal display;
a light emitting element configured to emit visible light;
a circuit board electrically and mechanically coupled to the light emitting element;
a lens configured to angularly redirect the visible light into a batwing configuration of first and second collimated light beams, the lens including a parabolic-shaped receiving surface facing the light emitting element and a transmission surface opposing the receiving surface, the transmission surface including an angle of curvature that increases closer to a plane of symmetry of the lens; and
a light guide panel configured to distribute light from the first and second light beams to a surface of the light guide panel facing the liquid crystal display.

14. The display device of claim 13, wherein:
an angle of a center of the first collimated light beam is greater than 45 degrees from the plane of symmetry of the lens, and
an angle of the second collimated light beam is greater than negative 45 degrees from the plane of symmetry of the lens.

15. The display device of claim 13, wherein:
the lens further includes feet opposing the transmission surface and from which the receiving surface extends;
a first perimeter of a surface of the lens facing the light emitting element and opposing the transmission surface is smaller than a second perimeter of the transmission surface, and the second perimeter includes first and second opposing curved edges with an angle of curvature that increases closer to the plane of symmetry of the lens.

16. The display device of claim 15, wherein:
the lens includes first and second sides extending between respective generally linear edges and respective feet; and
the first and second sides tilt away from the respective feet towards the respective generally linear edges.

17. The display device of claim 16 wherein:
the lens includes opposing third and fourth sides extending between the first and second curved edges in a first dimension, respectively, and a respective generally linear opposing edge of the generally linear opposing edges and a respective foot of the respective feet in a second dimension; and
the third and fourth sides include concave edges facing the light emitting element and extending between the between the first and second curved edges, respectively, and respective feet in a third dimension, wherein the third and fourth sides tilt away from the respective feet as they extend towards the first and second curved edges.

18. The display device of claim 16, wherein the concave edges include an angle of curvature that increases closer to the feet.

19. A method of forming a backlight apparatus, the method comprising:
obtaining a lens that includes a parabolic-shaped receiving surface and a transmission surface, the lens being symmetric about a plane of symmetry that bisects the transmission surface;
coupling the lens to a top of a housing that contains a light-emitting element therein such that the light emitting element faces an aperture in the top of the housing and a receiving surface of the lens the lens configured to angularly redirect light from the light-emitting element into a batwing configuration of first and second collimated light beams; and
electrically and mechanically coupling the light-emitting element to a circuit board.

20. The method of claim 19, further comprising situating a light guide panel to receive light emitted by the lens and to distribute the light towards a display device.

* * * * *

UNITED STATES PATENT AND TRADEMARK OFFICE
CERTIFICATE OF CORRECTION

PATENT NO. : 11,073,653 B2
APPLICATION NO. : 16/721609
DATED : July 27, 2021
INVENTOR(S) : Aas et al.

Page 1 of 1

It is certified that error appears in the above-identified patent and that said Letters Patent is hereby corrected as shown below:

In the Claims

In Column 9, Line 24, in Claim 9, delete "backlight:" and insert --backlight-- therefor In Column 9, Line 37, in Claim 11, after "dimension", insert --,--

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*